United States Patent
More et al.

(10) Patent No.: US 9,026,702 B2
(45) Date of Patent: May 5, 2015

(54) METHODS AND APPARATUS FOR FAST CONTEXT SWITCHING OF SERIAL ADVANCED TECHNOLOGY ATTACHMENT IN ENHANCED SERIAL ATTACHED SCSI EXPANDERS

(71) Applicant: LSI Corporation, Milpitas, CO (US)

(72) Inventors: Shankar T. More, Pune (IN); Vidyadhar Pinglikar, Pune (IN)

(73) Assignee: Avago Technologies General IP (Singapore) Pte Ltd, Singapore (SG)

( * ) Notice: Subject to any disclaimer, the term of this patent is extended or adjusted under 35 U.S.C. 154(b) by 235 days.

(21) Appl. No.: 13/674,659

(22) Filed: Nov. 12, 2012

(65) Prior Publication Data

US 2014/0136739 A1 May 15, 2014

(51) Int. Cl.
G06F 13/42 (2006.01)
G06F 13/00 (2006.01)

(52) U.S. Cl.
CPC ...................................... G06F 13/00 (2013.01)

(58) Field of Classification Search
CPC . G06F 13/4022; G06F 3/0689; G06F 13/385; H04L 45/00
USPC .................................................. 710/105, 316
See application file for complete search history.

(56) References Cited

U.S. PATENT DOCUMENTS

| | | | | |
|---|---|---|---|---|
| 7,584,319 B1 * | 9/2009 | Liao et al. | ...................... | 710/317 |
| 8,127,059 B1 * | 2/2012 | Carr et al. | ........................ | 710/74 |
| 8,539,135 B2 * | 9/2013 | Kabra et al. | ................... | 710/316 |
| 8,626,981 B1 * | 1/2014 | Roberts et al. | ................. | 710/316 |
| 2005/0071532 A1 * | 3/2005 | Bakke et al. | ................... | 710/300 |
| 2006/0031612 A1 * | 2/2006 | Bashford et al. | ................. | 710/74 |
| 2007/0226757 A1 * | 9/2007 | Bashford et al. | ................. | 719/326 |
| 2007/0271082 A1 * | 11/2007 | Dominguez et al. | ............. | 703/20 |
| 2008/0155163 A1 * | 6/2008 | Stenfort | ......................... | 710/315 |
| 2008/0155562 A1 * | 6/2008 | Stenfort et al. | ................ | 719/318 |
| 2008/0162773 A1 * | 7/2008 | Clegg et al. | .................... | 710/316 |
| 2009/0006697 A1 * | 1/2009 | Doherty et al. | ................ | 710/300 |
| 2009/0150643 A1 * | 6/2009 | Jones et al. | .................... | 711/203 |
| 2010/0153639 A1 * | 6/2010 | Corry et al. | .................... | 711/113 |
| 2011/0138097 A1 * | 6/2011 | Nakajima et al. | .............. | 710/316 |
| 2011/0145452 A1 | 6/2011 | Schilling et al. | | |
| 2012/0331181 A1 * | 12/2012 | Govande et al. | .................. | 710/8 |
| 2013/0166811 A1 * | 6/2013 | McKay et al. | ................. | 710/313 |
| 2014/0059256 A1 * | 2/2014 | Henning et al. | ................. | 710/36 |
| 2014/0115418 A1 * | 4/2014 | Raghavan et al. | ............ | 714/758 |
| 2014/0143472 A1 * | 5/2014 | More et al. | ...................... | 710/316 |
| 2014/0229652 A1 * | 8/2014 | Yadav et al. | ................... | 710/316 |
| 2014/0258572 A1 * | 9/2014 | More et al. | .................... | 710/107 |

* cited by examiner

*Primary Examiner* — Faisal M Zaman
(74) *Attorney, Agent, or Firm* — Duft Bornsen & Fettig

(57) ABSTRACT

Methods and apparatus for enabling Fast Context Switching (FCS) operation of an enhanced Serial Attached SCSI (SAS) expander and initiator for switching between one or more concurrently established connections including at least one Serial Advanced Technology Attachment (SATA) target device connection. Features and aspects hereof provide for enhanced logic within a SAS expander and/or initiator to detect the completion of an exchange over a first connection between an initiator device and a SATA target device and to allow switching to another (a second) connection without closing the first connection.

20 Claims, 5 Drawing Sheets

METHODS AND APPARATUS FOR FAST CONTEXT SWITCHING OF SERIAL ADVANCED TECHNOLOGY ATTACHMENT IN ENHANCED SERIAL ATTACHED SCSI EXPANDERS

BACKGROUND

1. Field of the Invention

The invention relates generally to Serial Attached SCSI (SAS) expanders and more specifically relates to implementation of Fast Context Switching (FCS) capability for Serial Advanced Technology Attachment (SATA) target devices and SATA Tunneling Protocol (STP) initiators coupled with FCS enhanced SAS expanders.

2. Discussion of Related Art

In a SAS environment, one or more SAS initiator devices are coupled with one or more SAS and/or SATA target devices through zero or more intermediate SAS expanders. In general, the collection of SAS expanders (that provide switchable connections between the various initiator and target devices) is referred to as a SAS Service Delivery Subsystem (SDS). SAS standards also provide for coupling SATA target devices to such an SDS utilizing the STP. STP enables an STP initiator to establish a connection through the SDS to a SATA target device coupled to the SDS.

In accordance with present SAS specifications, an open connection is initially established by a SAS initiator transmitting an Open Address Frame (OAF) through the SDS and receiving an acceptance (OPEN_ACCEPT primitive) from the identified SAS target device. The open request and acceptance are routed and passed through each SAS expander between the initiator and target. Once such a connection is established, all PHYs used for the connection by SAS expanders intermediate the initiator and target devices are essentially in a "pass-through" mode until the connection is closed by the initiator device (e.g., DONE primitives and CLOSE primitives are exchanged between the SAS end devices to thereby close the established connection). Once an expander senses that a previously established connection has been closed, it may again enter its state machine logic to await receipt of a next OAF to establish another connection. Similarly, in accordance with STP, connections are initially established by the STP initiator transmitting an OAF to an identified SATA target device. The SAS expander that is directly coupled with the identified SATA target device (the "end expander") responds with an OPEN_ACCEPT on behalf of the identified SATA device to thus establish the desired connection through the SDS. The STP initiator may similarly determine when the connection is no longer required and exchange appropriate DONE and CLOSE primitives with the end expander to close the established STP connection.

In initially establishing such a requested connection, SAS expanders intermediate the initiator and target devices acquire various resources within the expander to identify the requested connection and identify appropriate routing through PHYs of the expanders to establish and utilize the connection. When the SAS expander detects closure of a previously established connection, resources previously acquired for that connection are released for reuse to establish other connections within the expander.

In some recent developments, one vendor has proposed enhancements or extensions to the SAS protocols to allow multiple connections between a single initiator and multiple SAS target devices to remain open or established such that switching between connections may be performed by a faster switch operation rather than "tearing down" all resources by closing an established connection and re-opening another connection. For example, LSI Corporation proposes enhancements or extensions to the SAS protocols referred to as Fast Context Switching (FCS). An FCS enhanced SAS expander that is directly coupled to multiple SAS target devices is enhanced to maintain multiple established, open connections and to detect receipt of a new form of SAS frame that requests a fast context switch from the currently utilized, previously established connection to a another presently open, previously established connection. Thus, multiple established connections may remain open between a single SAS initiator and multiple SAS target devices and a new SAS frame (e.g., a SWITCH Address Frame—"SAF") may be used to rapidly switch between previously established connections without incurring the overhead of "tearing down" and "setting up" each connection sequentially. In essence, the SAF is processed the same as an OAF if there is no presently established connection that may be re-used for the requested new connection. However, if another previously established connection may be re-used, the SAF processing avoids all the overhead processing of "tearing down" and "setting up" connections each time a new connection is requested.

A problem arises in such FCS enhanced SAS expanders in that SATA devices coupled with the SDS are not capable of participating in the FCS enhanced features. Thus, an initiator device cannot maintain multiple open/established connections that include a SATA target device.

It is therefore an ongoing challenge to provide mechanisms to utilize FCS enhancements to maintain open connections to SATA target device coupled with SDS.

SUMMARY

The present invention solves the above and other problems, thereby advancing the state of the useful arts, by providing methods and apparatus for enabling Fast Context Switching (FCS) operation of an enhanced Serial Attached SCSI (SAS) expander for switching between one or more concurrently established connections including at least one Serial Advanced. Technology Attachment (SATA) connection. Features and aspects hereof provide for enhanced logic within a SAS expander to detect the completion of an exchange over a first connection between an initiator device and a SATA target device and to allow switching to another (a second) connection involving either the initiator device or the SAS/SATA target device without closing the first connection. Further features and aspects hereof provide for enhancements in an STP initiator to provide for such FCS features to switch among multiple established STP connections without closing previously established connections.

In one aspect hereof, system is provided comprising an FCS enhanced SAS expander. The FCS enhanced SAS expander comprises a first PHY adapted to couple with an initiator device. The expander further comprises a second PHY adapted to directly couple with a SATA target device. The expander further comprises a third PHY adapted to directly couple with a second target device. The system further comprises an STP initiator device coupled with the first PHY. The system is operable to establish a first connection through the expander between the STP initiator device and the SATA target device and a second connection through the expander between the STP initiator device and the second target device. The system is further operable to switch between the first connection and the second connection without closing either connection.

Another aspect hereof provides a method operable in an FCS enhanced SAS expander. The method comprises establishing a first connection between a initiator device and a first SATA target device directly coupled with the expander, receiving a DONE primitive (e.g., DONE(SWITCH) primitive) from the initiator device, transmitting a DONE primitive to the initiator device in response to receipt of the DONE primitive, receiving an SAF from the initiator device, and establishing a second connection between the initiator device and a second target device directly coupled with the expander without exchange of CLOSE primitives with the initiator device for the first connection. Further aspects hereof provide for further steps of the method within the enhanced expander to request a switch from a first connection between an initiator and a first target to a second connection between the initiator and a second target device.

Still another aspect hereof provides a method operable in an STP initiator device coupled with a Fast Context Switch (FCS) enhanced SAS expander. The method comprises establishing a first connection between the initiator device and a first Serial Advanced Technology Attachment (SATA) target device directly coupled with the FCS enhanced SAS expander, completing an exchange of data between the initiator device and the SATA target device, transmitting a DONE primitive (e.g., a DONE(SWITCH) primitive) to the FCS enhanced SAS expander responsive to completion of the exchange of data, receiving a DONE primitive from the FCS enhanced SAS expander, and transmitting a Switch Address Frame (SAF) to the FCS enhanced SAS expander to establish a second connection with a second target device directly coupled with the FCS enhanced SAS expander without transmitting a CLOSE primitive to the FCS enhanced SAS expander. Further aspects hereof provide for further steps of the method within the enhanced initiator to receive a request from an enhanced expander to switch from a first connection between the initiator and a first target to a second connection between the initiator and a second target device.

DETAILED DESCRIPTION OF THE DRAWINGS

Figure 1:
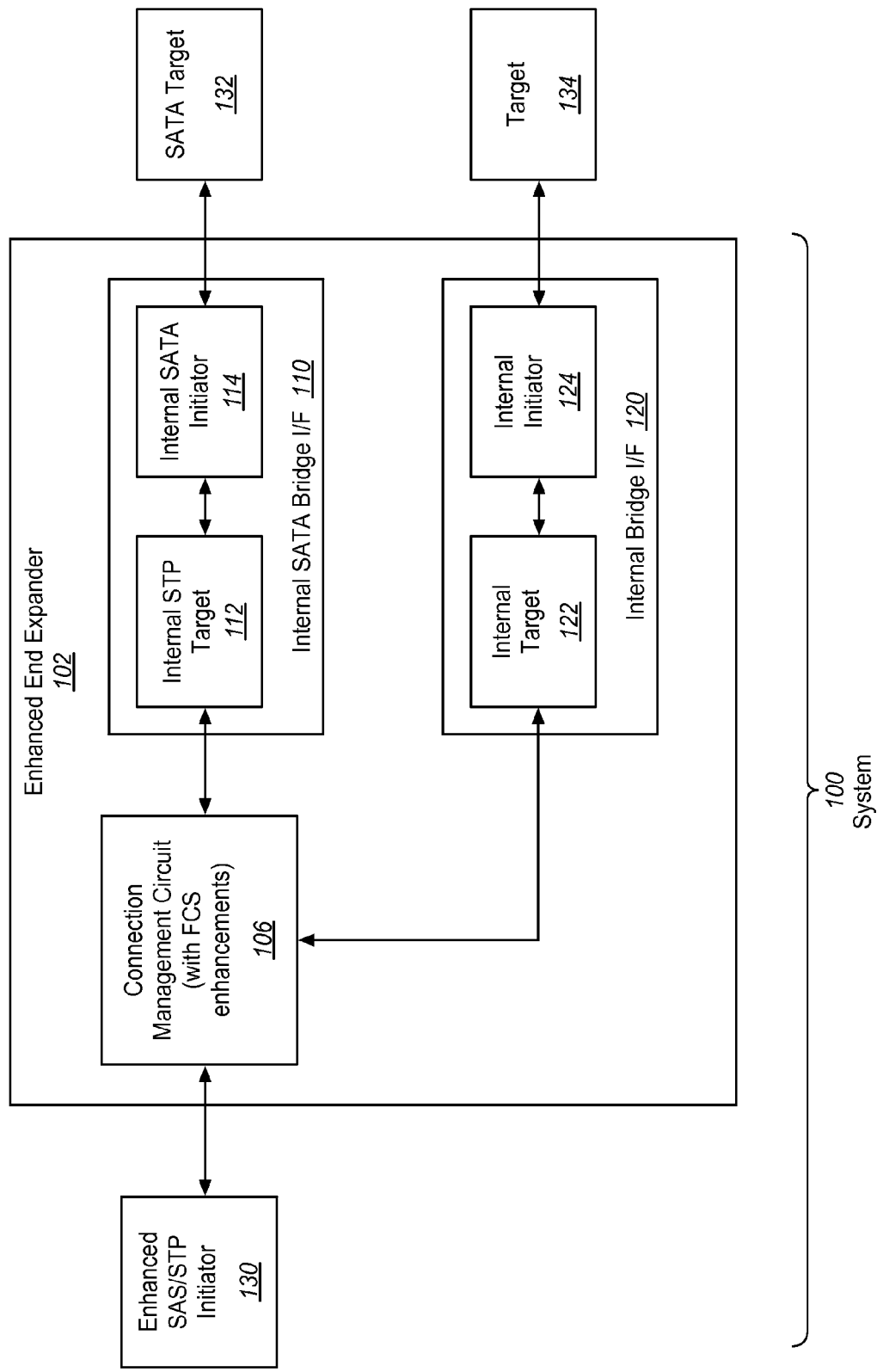
FIG. 1 is a block diagram of an exemplary system including an SAS expander and an STP initiator both enhanced in accordance with features and aspects hereof to enable FCS operations in conjunction with SATA target devices.

FIG. 1 is a block diagram of a system 100 comprising an enhanced FCS capable end SAS expander 102. Expander 102 is enhanced in accordance with features and aspects hereof to provide for use of Fast Context Switching (FCS) features of an enhanced SAS expander for connections with SATA end devices. System 100 comprises one or more initiator devices (e.g., enhanced STP initiator device 130) coupled with enhanced end SAS expander 102. Initiator device 130 may be directly coupled with expander 102 or may be indirectly coupled with expander 102 through any number of intermediate expanders of an SDS. Initiator 130 may comprise any suitable devices or systems for initiating connections with other devices through an SDS (including end expander 102). In particular, at least one initiator coupled with expander 102 is capable of STP exchanges through the SDS with a SATA target device 132). Exemplary initiator devices may include storage controllers such as host bus adapters (HBAs) within a computing system or other storage controller devices such as may be integrated within a storage subsystem. Expander 102 is referred to herein as an "end" expander in that it is the expander directly coupled with a plurality of target end devices such as target device 132 and target devices 134.

Expander 102 comprises a plurality of physical links (PHYs—not shown) each adapted to couple with an end device end devices such as initiator 130 and targets 132 and 134). Expander 102 is enhanced to provide for use of FCS features in switching among multiple established connections including SATA target devices (as well as SATA Tunneling Protocol (STP) initiator devices).

Fast Context Switching (FCS) Background

Before discussing the present invention, a preliminary note is valuable to generally discuss the purpose, operation, and structure of FCS enhancements in a SAS domain. Using existing SAS protocol (as defined through the SAS 2 specification) the collection of pathways (pathways through expanders) between an identified SAS initiator device and an identified SAS target device must be completely "torn down" whenever a new pathway between these devices is required. Whenever a new connection is required, each expander between the two end devices participates in establishing that requested connection. Assuming there are a number ("N") of expanders between the two end devices, if each expander takes "ConDelay" amount of time to perform the necessary "set up" and "tear down" steps in the connection, the overall connection overhead time can be roughly calculated as:

$$ConnectionTime=N*ConDelay$$

Thus, to establish 32 such connections different connections between an initiator and 32 different target devices, the total overhead time to establish connections would be:

$$ConnectionTime=32*N*ConDelay.$$

FCS features provide a new method in enhancements to the SAS protocol to reuse the connection pathways in the expanders between two end devices and to perform localized connection/context switches only at the last expander in the chain of expanders coupling the initiator with the identified SAS target device (i.e., a context switch is performed with the last/end expander that is directly coupled with the SAS target devices). The "context" for each connection within this last expander is saved so that the set up and tear down overhead is incurred only in the last of the expanders in the chain. Using this approach, the time to perform 32 connections would be:

$$ConnectionTime=(N*ConDelay)+(31*ConDelay)$$

If you assume N=5 expanders, and ConDelay of 200 ns, then the difference between these is 32 us versus 7.2 us, which is significant.

In existing SAS protocols, when an end device determines that it has no more frames to transmit to the other end device, it transmits a DONE primitive. When the DONE primitives have been exchanged between each of the end devices to indicate that neither presently has data to be sent to the other, the devices are then required to exchange CLOSE primitives. This CLOSE primitive exchange is the stimulus for each expander in the pathway between the connected initiator and target to tear down its piece of the pathway, resulting in the need to re-establish every piece of the pathway again on a subsequent connection.

For example, in accordance with present SAS standard protocols, exchanges between a single initiator ("I") and three different targets ("T1", "T2", and "T3") may proceed as follows:

| From "I" to "Tx" | From "Tx" to "I" |
|---|---|
| OPEN (establish new connection to T1) | |
| (resources acquired in expanders) | OPEN_ACCEPT |
| <frame traffic in connection with T1> | <frame traffic in connection with T1> |
| DONE | DONE |
| CLOSE | CLOSE |
| | (resources within expanders released) |
| OPEN (establish new connection to T2) | |
| (resources acquired in expanders) | OPEN_ACCEPT |
| <frame traffic in connection with T2> | <frame traffic in connection with T2> |
| DONE | DONE |
| CLOSE | CLOSE |
| | (resources within expanders released) |
| OPEN (establish new connection to T3) | |
| (resources acquired in expanders) | OPEN_ACCEPT |
| <frame traffic in connection with T3> | <frame traffic in connection with T3> |
| DONE | DONE |
| CLOSE | CLOSE |
| | (resources within expanders released) |
| OPEN (establish new connection to T1) | |
| (resources acquired in expanders) | OPEN_ACCEPT |
| <frame traffic in connection with T1> | <frame traffic in connection with T1> |
| . . . | . . . |

In an FCS enhanced expander such as those from LSI Corporation, an enhanced expander to which an end device is directly coupled modifies the use of the DONE primitives by the directly coupled end device. Using a new primitive (herein named "DONE(SWITCH)" as distinct from the primitive used in a SAS standard herein named "DONE(NORMAL)"), the expander can communicate the intention that traffic for the current connection is complete, but a new SAS "switch" is permitted to re-use the resources of the established connection. Use of the DONE(SWITCH) primitive indicates that the typical CLOSE primitive exchange will not be performed. Instead, a new type of frame, herein named a Switch Address Frame (SAF), is transmitted to communicate the new connection information. In some embodiments, the Switch Address Frame (SAF) uses the same information as contained in the SAS standard Open Address Frame (OAF), with the Frame Type field modified to a value of 0x2. Processing of an SAF then follows similar processing as existing OAF processing in determining what connection gets established and what resources are needed. If the new connection can utilize resources (e.g., pathways) of an existing connection, few or no new resources need be allocated. If the SAF requested connection is a new (not yet established) connection that cannot benefit from use of other existing connections, then resources are allocated and the SAF is processed as a standard OAF within the expanders of the SDS.

For example, in accordance with FCS enhancements to the SAS standard protocols, exchanges between a single initiator ("I") and three different targets ("T1", "T2", and "T3") may proceed as follows:

| From "I" to "Tx" | From "Tx" to "I" |
|---|---|
| SWITCH(T1) | |
| (establish or re-establish connection to T1) | |
| | OPEN_ACCEPT |
| <frame traffic in connection with T1> | <frame traffic in connection with T1> |
| DONE(SWITCH) | DONE(NORMAL) |
| SWITCH(T2) | (resources within expanders |
| (establish or re-establish connection to T2) | NOT released for connection with T1) |
| | OPEN_ACCEPT |
| <frame traffic in connection with T2> | <frame traffic in connection with T2> |
| DONE(SWITCH) | DONE(NORMAL) |
| SWITCH(T3) | (resources within expanders |
| (establish or re-establish connection to T3) | NOT released, for connection with T2) |
| | OPEN_ACCEPT |
| <frame traffic in connection with T3> | <frame traffic in connection with T3> |
| DONE(SWITCH) | DONE(NORMAL) |
| SWITCH(T1) | (resources within expanders |
| (re-establish connection with T1) | NOT released for connection with T3) |
| | OPEN_ACCEPT |
| <frame traffic in connection with T1> | <frame traffic in connection with T1> |
| DONE(NORMAL) | DONE(NORMAL) |
| (SAS standard CLOSE protocol will follow) | |
| CLOSE | CLOSE |
| (resources within expanders released for connection with T1) | (resources within expanders released for connection with T1) |

By preventing the exchange of CLOSE primitives between the end devices, previously established connections may be re-used. Without the trigger of a CLOSE primitive exchange, the expanders are not involved in the tear down of existing pathways and thus remain in a state of an open connection in which they are generally forwarding information between their SAS PHY interfaces.

In the FCS enabled "end expander" that is coupled with each of the plurality of end devices (target devices), connections to each of the plurality of end devices (directly coupled target devices) are closed and re-opened as switch requests (SAE) are received from the initiator device. The connection pathways through all other expanders intermediate the initiator device and the end expander remain open. When a switch happens, the target end device sends a CLOSE primitive that is consumed by the FCS enabled end expander. The initiator device does not send a CLOSE primitive when it is doing an FCS switch. So connection between the initiator device and the end expander is retained (including through any intermediate expanders between the initiator device and the end expander). Only the connection between the target device that sent the CLOSE primitive and the end expander is torn down. Responsive to a next switch request (SAF from the initiator device) the end expander establishes a new connection (switch) with a next addressed device.

After the initiator has requested all desired switches (i.e., transmits a DONE(NORMAL) as opposed to a DONE (SWITCH)), the CLOSE primitive from the last addressed target/end device is not consumed by the end expander and instead is sent to the initiator device. The initiator device then responds with a CLOSE primitive (in accordance with SAS standards) to cause the final teardown of all previously established connections (between the initiator device and the end expander) thus freeing resources in all intermediate expanders to establish new connections. The FCS features may all implemented within enhanced expanders largely transparent to all end devices (thus obviating the need for updating all initiator and target devices). An FCS enhanced "end expander" (an expander directly coupled with one or more end devices) can monitor all of the connection requests from all of its directly coupled end devices, and determine when a Switch Address Frame (SAF) may use an already established connection. For example, say a connection already exists between initiator device "I" and target device "T1". When target device "T2" (also directly coupled with the same FCS enhanced expander) requests a connection to initiator "I", the FCS enhanced expander is able to determine that the existing connection between "I" and "T1" already provides the correct pathways through the SAS Delivery Subsystem (SDS). When "T1" transmits its DONE primitive (i.e., a "DONE(NORMAL)" primitive), the FCS enhanced end expander transforms the primitive into a DONE(SWITCH) new primitive. Once the DONE primitives have been exchanged, the OPEN Address Frame from "T2" is then transformed into a SWITCH Address Frame to establish the new connection using the already established pathways through the SDS.

SATA Connections with FCS

Returning now to FIG. 1 and features and aspects hereof, as noted above, current FCS enhanced expanders present a problem in that the FCS features are not available for switching among connections that include SATA (and STP) end devices. In a STP/SATA connection, the DONE primitives are not exchanged such that an opportunity is presented to use the DONE and DONE(SWITCH) primitives as required for FCS features. In accordance with features and aspects hereof, system 100 of FIG. 1 is enhanced to enable use of FCS features in STP/SATA connections through expander 102.

In particular, expander 102 comprises connection management circuit 106 coupled with internal SATA bridge interface (I/F) 110 to enable use of FCS features (under control of connection management circuit 106) to SATA target (end) device 132. Expander 102 also comprises any number of PHYs (not shown) for coupling the enhanced expander with any number of other SAS devices including, for example, "source" PHYs (not shown) for coupling expander 102 with initiator 130 and "destination" PHYs (not shown) for coupling expander 102 with target devices 132 and 134. Connection management circuit 106 comprises any suitable logic circuits for managing the establishment and termination of connections between PHYs of expander 102. In particular, connection management circuit 106 may include Fast Context Switching (FCS) enhancements for improving performance in switching between connections of various PHYs of expander 102. In general, connection management circuit 106 may be implemented as portions of SAS link layer logic circuits associated with each PHY of the expander or any other suitable control logic within expander 102. Further, connection management circuit 106 further comprises suitable switching circuits (e.g., a "crossbar switch") for controllably connecting desired pairs of PHYs. Such switching features are well known to those of ordinary skill in the art and are thus omitted for simplicity and brevity of this discussion.

SATA bridge I/F 110 comprises internal STP target 112 and internal STP initiator 114 circuits for allowing buffered communications in an STP connection between an STP initiator (e.g., initiator 130) and SATA target device 132. Some exemplary embodiments of bridge interface 110 may further comprise a buffer memory element between target 112 and initiator 114 to permit speed matching and other buffering functions in bridge interface 110. The SAS specification generally presents features of such a SATA bridge interface. In such an architecture, the internal STP target (e.g., 112) may be adapted to provide a standard CLOSE primitive exchange with STP initiator 130 so as to close an established SAS connection in an orderly manner (thus releasing resources for all related pathways through any intermediate expanders).

Some bridge interfaces within a SAS expander may also provide buffer memory features to enable still other enhancements. One such exemplary buffered bridge interface is referred to as "End Device Frame Buffering" or EDFB in the context of expanders from LSI Corporation. In general, such buffering is referred to in the art as "store and forward" communications. In such a connection, an STP initiator (e.g., 130) establishes a connection with SATA target device 132 and, transparent to the initiator, is connected through connection management circuit 106 to internal STP target 112. The internal STP target performs all SATA exchanges with the STP initiator and may temporarily store information to be forwarded to SATA target 132 (e.g., in a buffer memory or FIFO). Internal STP initiator 114, in turn, forwards the information to SATA target device 132.

In accordance with features and aspects hereof, internal STP target 112 (in conjunction with connection management circuit 106) is enhanced to exchange DONE primitives with the STP initiator when a SATA exchange is completed. By exchanging DONE primitives, a DONE(SWITCH) primitive may be provided to indicate to connection management circuit 106 that a switch is requested to another connection without requiring closing of the current STP connection. Thus, SATA end devices may participate in the FCS feature enhancements such that connections may be rapidly switched between SAS and/or SATA devices through an FCS enhanced expander.

Expander 102 may comprise any number of such buffered SATA interfaces (110) as well as SAS buffered interfaces (e.g., buffered connection 120 comprising internal target 122 and internal initiator 124). A first connection may be established between initiator 130 and SATA target 132 while a second connection is established between initiator 130 and target 134. Thus, FCS features and aspects hereof may enable fast context switching between a SATA connection involving a target device directly coupled with enhanced expander 102 and any other SAS or SATA connection involving any other target device directly coupled with the enhanced expander.

For example, a first connection could be established between initiator device 130 (e.g., an STP initiator) and SATA target device 132. A second connection may be established between initiator 130 and target device 134 (e.g., either as an STP or SSP connection as appropriate). A DONE(SWITCH) primitive received at internal STP target 112 from initiator 130 informs target 112 (and connection management circuit 106) that initiator 130 wishes to perform a switch from the first connection to a second connection. Expander 102 and initiator 130 therefore do not exchange CLOSE primitives and thus other expanders of the SDS are not "triggered" to tear down the pathways of the first connection. Rather, initiator 130 next transmits an SAE requesting a switch to the previously established (or to be established) second connection with target device 134. Both the first and second connection may then remain established and only end expander 102 need reconfigure its switching circuits to connect initiator 130 (through its source PHY) to a different target device (e.g., 132 or 134). Internal STP target 112 associated with the first connection provides the required enhancements in cooperation with the enhanced features of STP initiator 130 to enable FCS switching features with SATA devices.

Those of ordinary skill in the art will readily recognize numerous additional and equivalent elements that may be present in a fully operational system 100. In particular, as noted above, any number of intermediate expanders may be present between end expander 102 and initiator 130. Further, any number of initiator or target devices (or intermediate expanders) may be coupled with expander 102 as appropriate for the total number of PHYs configured in the expander. Still further, features and aspects hereof provide for enabling use of FCS features with a SATA target device. Any number of data and SAS/SATA target devices may be present and may be involved in the FCS switching features of expander 102. Thus, switching connections of an initiator may be provided between SATA target devices, between SAS target devices, or between a SAS and a SATA target device.

Figure 2:
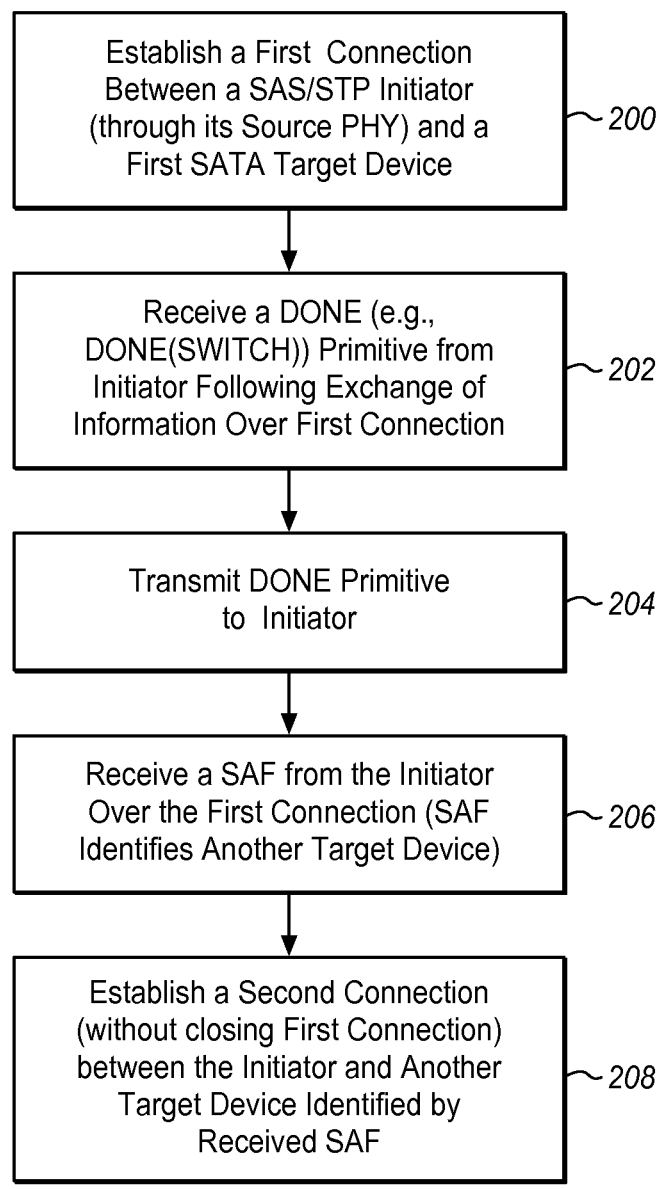
FIGS. 2 through 5 are flowcharts describing exemplary methods in accordance with features and aspects hereof to enable FCS operations in conjunction with SATA target devices.

FIG. 2 is a flowchart depicting an exemplary method in accordance with features and aspects hereof for enabling use of FCS features of an enhanced expander in conjunction with SATA target devices. In particular, the method of FIG. 2 describes operation of an enhanced SAS expander to enable the use of FCS features with SATA target devices. The method of FIG. 2 may be operable in an enhanced SAS expander such as expander 102 of FIG. 1 and more specifically, may be operable in FCS features within connection management circuit 106 and internal STP target 112 of FIG. 1.

At step 200, a first connection is established between an STP initiator coupled with the expander through its source PHY and a first SATA target device. Following exchange of information over the established first connection, step 202 receives a DONE primitive from the initiator indicating completion of the exchange of information. In accordance with FCS features, if the initiator desires to switch to another connection, the DONE primitive is preferably encoded as a DONE(SWITCH) primitive. Responsive to receipt of the DONE(SWITCH) primitive, the expander at step 204 transmits a DONE primitive back to the initiator. At step 206, the expander receives an SAF from the STP initiator over the first connection. The SAF identifies another target device to which the initiator desires a connection. At step 208, the expander establishes the desired second connection to the identified target device without closing the first connection (since, in accordance with FCS features, the initiator indicated by the DONE primitive exchange that it was desirous of maintaining the established first connection). If the identified second connection had been previously established, step 208 merely reconfigures operation of the expander (e.g., its crossbar switch configuration) to re-connect or re-establish the second connection to the identified target device. As noted above, the desired switch from the first connection with a SATA device may entail switching to another SATA target device or to a SAS target device (if the initiator is so capable). If the desired second connection had not yet been established, the SAF is processed as a standard OAF to initially establish the desired second connection.

Figure 3:
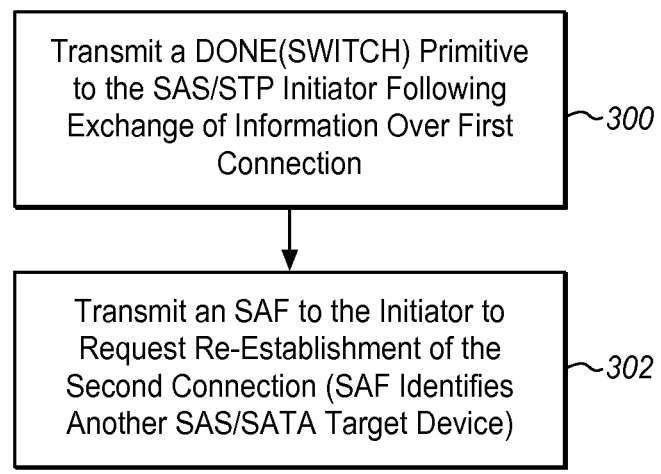

As discussed above, FCS features allow not only "forward" switching (i.e., an initiator requesting a switch to a different target), but also provide for "reverse" switching (i.e., the FCS enhanced expander requesting re-establishment of a connection between the initiator device and another target device without closing the first connection). FIG. 3 is a flowchart describing an exemplary method for performing such a reverse switch operation on behalf of a SATA target device by operation of an enhanced expander such as expander 102 of FIG. 1. The method of FIG. 3 is performed when the expander detects a request from a SATA target device to establish (or re-establish) a connection to the same initiator device as in a presently established connection. If the expander determines that the requested connection has been previously established, step 300 transmits a DONE(SWITCH) primitive to the initiator of the presently established first connection following the exchange of information over the first connection. At step 302, the expander (i.e., the internal STP target engaged within the expander on behalf of the SATA target for the first connection) transmits an SAF to the same initiator requesting re-establishment of the previously established second connection. The SAF identifies the other SATA target device to which the requesting target desires to establish a connection.

Figure 4:
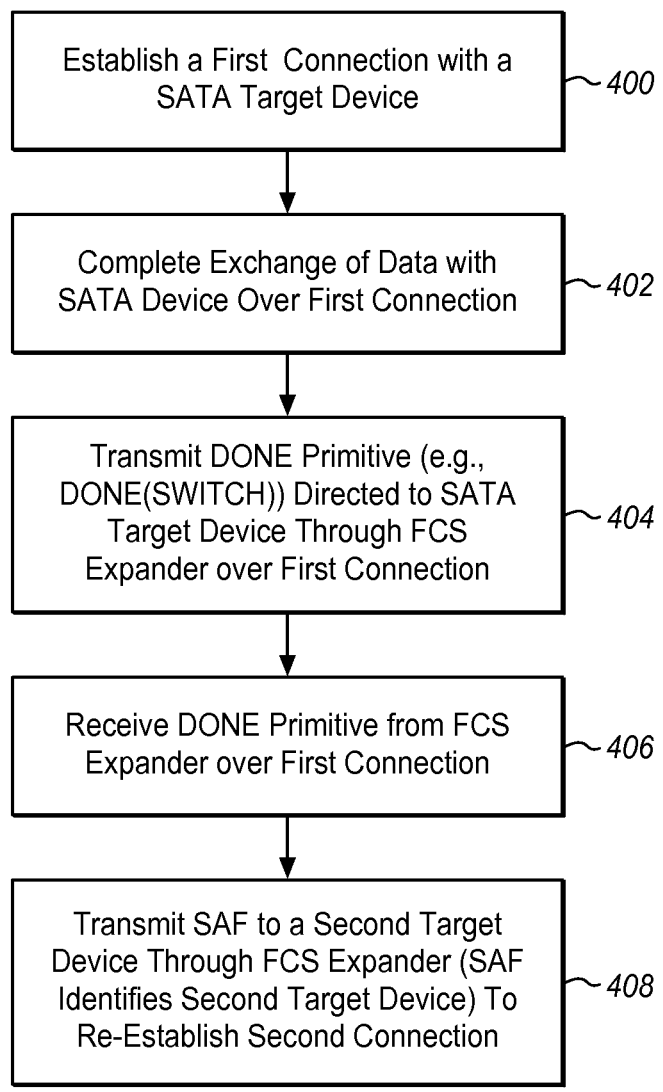

Enhanced features of the initiator described above with respect FIGS. 2 and 3 are operable in conjunction with an enhanced STP initiator enhanced to provide for FCS features in requesting switching between multiple previously established connections. FIG. 4 is a flowchart describing an exemplary method in accordance with features and aspects hereof for enabling use of FCS features of an enhanced expander in conjunction with SATA target devices. The method of FIG. 4 may be operable in an enhanced initiator such as initiator 130 of FIG. 1. At step 400, an enhanced STP initiator establishes a first connection with a SATA target device through standard STP protocols. Step 402 represents completion of the exchange of data with the SATA target device over the established first connection. Responsive to completion of the data exchange, step 404 transmits a DONE(SWITCH) primitive from the enhanced STP initiator directed to the SATA target device of the first connection through the FCS enhanced expander. At step 406 the enhanced STP initiator receives a DONE primitive from the FCS enhanced expander on behalf of the SATA target device of the first connection. At step 408 the enhanced STP initiator transmits an SAF to a second SATA target device through the FCS enhanced expander. The SAF identifies the second SATA target device to which the enhanced STP initiator wishes to re-establish/establish a connection.

Figure 5:
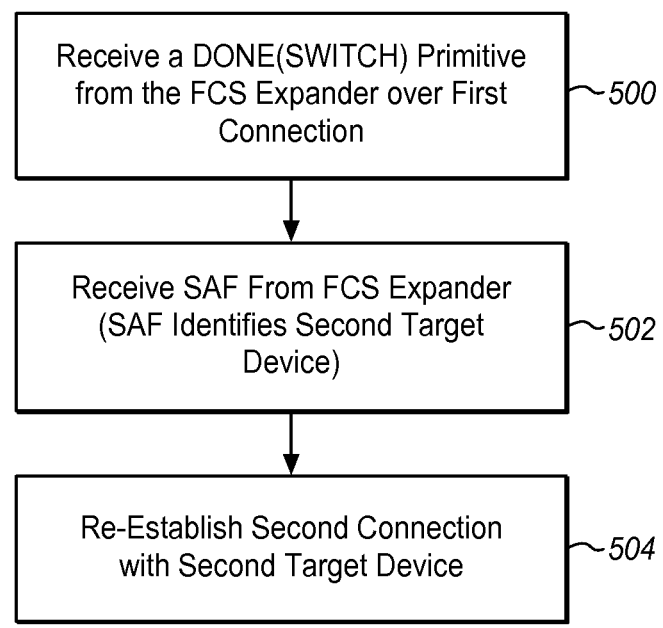

As above with respect to FIG. 3, the enhanced STP initiator may also receive transmissions from the enhanced expander indicating a desire of a SATA target device to re-establish a connection (e.g., a "reverse" switch). FIG. 5 is a flowchart describing an exemplary method in accordance with features and aspects hereof to provide for such reverse switching within an enhanced STP initiator such as initiator 130 of FIG. 1. At step 500, the enhanced STP initiator receives a DONE (SWITCH) primitive from the FCS expander following completion of a data exchange on a first connection with the SATA target device. The DONE(SWITCH) primitive indicates that some other SATA target device wishes to re-establish a connection with the enhanced STP initiator. At step 502, the enhanced STP initiator receives an SAF from the FCS expander identifying the second device desiring to re-establish the second connection. At step 504, the enhanced STP initiator accepts the request and re-establishes/establishes the second connection with the second SATA target device.

Those of ordinary skill in the art will readily recognize numerous additional and equivalent steps that may be present in fully functional methods such as described above with respect FIGS. 2 through 5. Such additional and equivalent steps are omitted herein for simplicity and brevity of discussion.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method operable in a Fast Context Switch (FCS) enhanced Serial Attached SCSI (SAS) expander, the method comprising:
   establishing a first connection between an initiator device and a first Serial Advanced Technology Attachment (SATA) target device directly coupled with the expander;
   receiving a DONE primitive from the initiator device before the first connection is closed;
   transmitting a DONE primitive to the initiator device in response to receipt of the DONE primitive;
   receiving a Switch Address Frame (SAF) from the initiator device over the first connection; and
   establishing a second connection between the initiator device and a second target device directly coupled with the expander without receiving a CLOSE primitive from the initiator device for the first connection, wherein establishing the second connection is performed in response to receiving the SAF and without closing the first connection.

2. The method of claim 1 wherein the received DONE primitive is a DONE (SWITCH) primitive.

3. The method of claim 1 further comprising:
   receiving a DONE(SWITCH) primitive from the initiator device within the second connection;
   transmitting a DONE primitive to the initiator device in response to receipt of the DONE(SWITCH) primitive;
   receiving a Switch Address Frame (SAF) from the initiator device wherein the SAF indicates a request to re-establish the first connection; and
   re-establishing the first connection between the initiator device and the first SATA target device without receiving a CLOSE primitive from the initiator device for the second connection.

4. The method of claim 1 wherein the second target device is a SAS target device.

5. The method of claim 1 wherein the second target device is a SATA target device.

6. The method of claim 1 further comprising:
   transmitting a DONE(SWITCH) primitive to the initiator device; and
   transmitting an SAF to the initiator device requesting re-establishment of the first connection.

7. The method of claim 1, wherein:
   the DONE primitive from the initiator device directs the expander to switch from the first connection to the second connection, and is transmitted to an internal SATA Tunneling Protocol (STP) target at the expander,
   the SAF identifies the second target device for the second connection, and
   establishing the second connection is performed in response to receiving the SAF.

8. The method of claim 1, further comprising:
   establishing a second connection between the initiator device and the second target device is performed by preserving a portion of a connection pathway for the first connection.

9. The method of claim 1, wherein:
   establishing the second connection is performed based on information in the SAF.

10. A method operable in a Serial Advanced Technology Attachment (SATA) Tunneling Protocol (STP) initiator device coupled with a Fast Context Switch (FCS) enhanced SAS expander, the method comprising:
   establishing a first connection between the initiator device and a first SATA target device directly coupled with the FCS enhanced SAS expander;
   completing an exchange of data between the initiator device and the SATA target device;
   transmitting a DONE primitive to the FCS enhanced SAS expander responsive to completion of the exchange of data and before the first connection is closed;
   receiving a DONE primitive from the FCS enhanced SAS expander; and
   transmitting a Switch Address Frame (SAF) over the first connection to the FCS enhanced SAS expander, to establish a second connection with a second target device directly coupled with the FCS enhanced SAS expander without transmitting a CLOSE primitive to the FCS enhanced SAS expander, wherein establishing the second connection is performed in response to receiving the SAF and without closing the first connection.

11. The method of claim 10 wherein the transmitted DONE primitive is a DONE (SWITCH) primitive.

12. The method of claim 10 further comprising:
   receiving a DONE(SWITCH) primitive from the expander;
   receiving an SAF from the expander requesting re-establishment of the first connection; and
   re-establishing the first connection responsive to receipt of the SAF.

13. The method of claim 10 wherein the second target device is a SAS target device.

14. The method of claim 10 wherein the second target device is a SATA target device.

15. The method of claim 10, wherein:
   the DONE primitive transmitted to the FCS enhanced SAS expander directs the expander to switch from the first connection to the second connection, and is transmitted to an internal SATA Tunneling Protocol (STP) target at the expander, and
   the SAF identifies the second target device for the second connection.

16. The method of claim 10, wherein:
   the second connection between the initiator device and the second target device includes a portion of a connection pathway for the first connection.

17. The method of claim 10, wherein:
   information in the SAF describes the second connection.

18. A system comprising:
   a Fast Context Switch (FCS) enhanced Serial Attached SCSI (SAS) expander, the FCS enhanced SAS expander comprising a first physical link (PHY) adapted to couple with an initiator device, the expander further comprising a second PHY adapted to directly couple with a Serial Advanced Technology Attachment (SATA) target device, the expander further comprising a third PHY adapted to directly couple with a second target device; and
   a Serial Advanced Technology Attachment (SATA) Tunneling Protocol (STP) initiator device coupled with the first PHY,
   wherein the system is operable to establish a first connection through the expander between the STP initiator device and the SATA target device, and to establish a second connection through the expander between the STP initiator device and the second target device,
   wherein a DONE primitive is transmitted along the first connection while the first connection is open, wherein establishing the second connection is performed in response to receiving a Switch Address Frame (SAF) over the first connection, and wherein the system is operable to switch between the first connection and the second connection without closing either connection.

19. The system of claim 18, wherein:

the system is operable to switch between the first connection and the second connection by providing a DONE primitive to a SATA Tunneling Protocol (STP) target of the FCS enhanced SAS expander, wherein the DONE primitive directs the expander to switch from the first connection to the second connection.

20. The system of claim 18, wherein:

the second connection includes a portion of a connection pathway for the first connection.

* * * * *